United States Patent Office 3,529,305
Patented Sept. 15, 1970

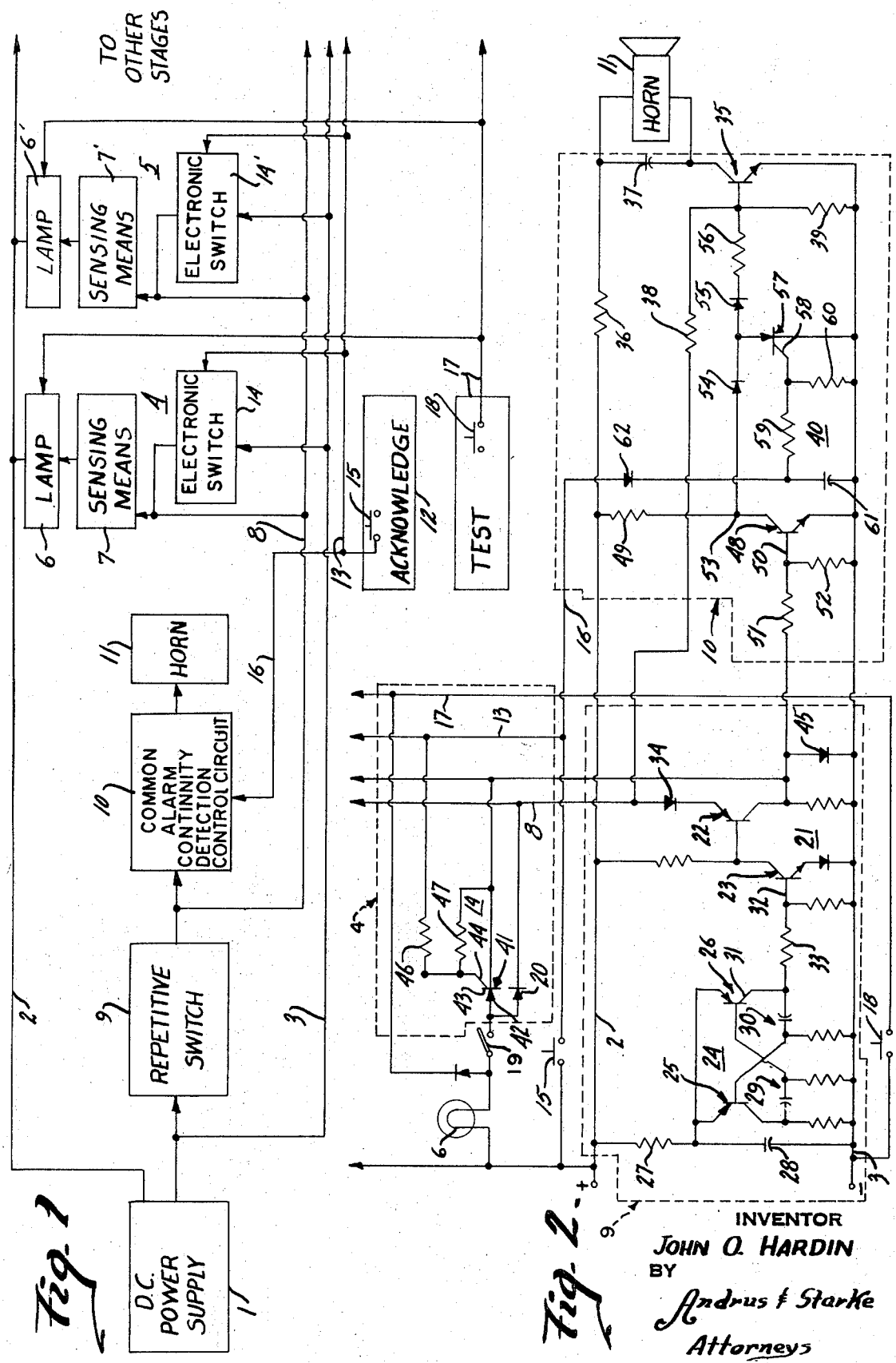

---

3,529,305
CONDITION MONITORING SYSTEM
John O. Hardin, Garland, Tex., assignor to Johnson Service Company, Milwaukee, Wis., a corporation of Wisconsin
Filed Oct. 22, 1965, Ser. No. 500,955
Int. Cl. G08b 19/00, 29/00
U.S. Cl. 340—213.1                                   10 Claims This invention relates to a condition monitoring system and particularly to such a system having means to sense the state or characteristic of one or more devices or conditions and to produce an individual and a common indication or record upon establishments of a predetermined state or characteristic.

In operation of a complex system having one or more variables, a monitoring system which can provide continuous monitoring of the variables from a predetermined band is highly desirable. For example, in temperature control systems and the like, an audio and/or a visual indication can be provided. A visual alarm can indicate the location of the particular malfunction while the audio alarm can attract the attention of the attendant to the visual alarm. Alhough such annunciating controls for a plurality of variables have been suggested, they have all had certain disadvantages; primarily arising from the result of relatively high circuit complexity with the attendant increase in cost and reduced reliability.

In connection with the following description of the present invention, a temperature control or a condition responsive control will be described employing a visual indication for identifying a particular abnormal condition and an audible signal for attracting attention in response to any abnormal condition. The audible and visual alarm is described because of its present acceptance in commercial use and is also suitable for purposes of clearly discussing and explaining the several aspects and novel features of the present invention.

Generally, the present invention is directed to an improved monitoring or annunciating system employing a minimum number of solid state components to provide an economical and reliable unit particularly adapted for commercial production and applications. One of the advantages of the improved system is that it can be completely wired and assembled on the production line and installed in the system with a very minimum number of field wiring connections.

Generally, in accordance with the present invention, each of the variables to be controlled includes a sensing means connected in circuit with a visual alarm which can be operated in three states; off, continuously on and intermittently on-off or flashing. Upon creation of an abnormal condition, one state is hereinafter described wherein a flashing visual display is created. Simultaneously, upon actuation of any visual alarm, an audible alarm capable of three operational states is simultaneously actuated into a similar intermittent or flashing state. The supervisory personnel or attendant must acknowledge the fault through operation of a suitable control and in so doing silences the audible control and changes the state of the visaul alarm from a flashing characteristic to a steady state. The system thus employs a change of state in the visual alarm to provide both an indication of the initial alarm and an indication of a previously acknowledged alarm.

Upon correction or return to normal of the fault, the visual alarm is turned off and returned to the standby condition. Further, in accordance with a novel feature of the present invention, the audible alarm is again actuated for example as a continuous horn sound to indicate that a fault has been corrected and the system returned to normal. This must be acknowledged in order to reset the audible alarm to standby.

The circuit of the present invention includes low voltage, solid state components which operate from a low voltage supply such as a 28 volt direct current supply and can operate without any regulation. The circuit and particularly the sensing branches employ passive rather than active devices which are interconnected in a relatively simple control circuitry. The use of solid state devices in addition to the above features has the inherent advantages of reliability, long life, low energy consumption and dissipation and the like.

In summary, by employing two indicating means such as a lamp and a horn which are to be actuated in any one of the three states consisting of normal off, intermittent or repetitive actuation or a continuous actuation provides a means to indicate completely normal operation, a failure which has or has not been acknowledged and a correction of a failure which has or has not been acknowledged.

More particularly, in one form of the present invention, condition sensing switch means or other circuit altering means are connected in a condition sensitive circuit with an associated lamp. A repetitive switch circuit is connected in common to complete the power connection of the condition sensitive circuits. Normally, the sensing means disables the circuit to prevent energization of the lamp. Upon failure, the sensing means is actuated to complete the circuit and the repetitive switch circuit causes flashing energization of the lamp. A common alarm control circuit is interconnected with the condition sensitive circuits and the repetitive switch circuit such that upon actuation of any sensing means, the horn is also intermittently actuated at the same frequency as the lamp.

The condition sensing means might be a temperature sensitive relay unit or the like having normally open contacts connected in series with the lamp and a suitable diode to the repetitive switch circuit. The repetitive switch circuit can be a multistable vibrator driving an amplifier, with the amplifier output circuit connected in series-parallel with the lamp circuit. The repetitive electronic switch circuit will thus consist of the turning on and off of the amplifier at the frequency of the multivibrator. When a set of condition sensitive contacts closes, the circuit will be completed through the amplifier of the switching circuit to flash the lamp. The horn or audible indicator is connected to the power circuit through a suitable amplifier having an input connected via the input or the output of the amplifier which can only operate or generate an output when one of the sensing switches is closed. Consequently, when the circuit is thus established to flash a lamp, the output of the amplifier will simultaneously control the input to the horn amplifier to control the operation of the horn in a similar manner. Additionally, the common alarm control circuit includes an inhibiting or bypass circuit adapted to provide an alternative source of energy to the horn amplifying transistor or to positively cut off the operation of the transistor. The acknowledgment is provided by providing a separate circuit between the power supply and the condition sensing circuits and in particular provides a direct connection or return path to the power supply in parallel with the amplifier of the repetitive electronic switch circuit. This will turn off the amplifying transistor while maintaining continuous rather than intermittent illumination of the lamp. Similarly, the turn-off of the amplifying transistor removes the power from the horn amplifying transistor and turns off the horn completely. The acknowledgment bypass circuit for example can consist of a silicon controlled rectifier interconnected between the lamp circuit to provide a direct return path in parallel with the amplifying transistor of the flasher circuit.

When the default or condition returns to normal, the sensing contact unit will open and break the flashing circuit to the lamp. This action also results in activation of the inhibit circuit of the common alarm control circuit which detects the change in the circuit condition back to normal and through the inhibiting circuit supplies power to power the amplifying transistor and thereby energize the horn in a continuous manner. This therefore provides an audible signal to the attendant noting the correction of the fault and requiring acknowledgment. Preferably, the acknowledgment is effected through the same mechanism or switch control provided with the initial fault acknowledgment and may include application of a control signal to the inhibiting circuit to return it to a turn-off or standby position. Thus, the inhibiting circuit can consist of an amplifier or transistor adapted to supply power to the base of the horn amplifying transistor. In circuit therewith, a shorting silicon controlled rectifier is connected or provided to short circuit the main transistor and thus bypass any current and positively prevent operation from the acknowledged individual alarm station. Thus, acknowledgment of the corrected condition triggers the silicon controlled rectifier to disconnect the horn circuit. The silicon controlled rectifier is reset by the initial triggering of the circuit through actuation of a reset transistor applying a reverse bias across the silicon controlled rectifier to turn it off and condition it for the above operation.

The drawing furnished herewith illustrates a preferred construction in which the above advantages and features are clearly disclosed as well as others which will be clear from the following description.

In the drawing:

FIG. 1 is a block diagram of an audio visual monitoring circuit incorporating the components of the present invention; and FIG. 2 is a schematic circuit diagram of the components shown in FIG. 1 employing a preferred construction of the components shown in FIG. 1.

Referring to the drawing and particularly to FIG. 1, a monitoring or annunciating system is shown adapted to be powered from a single direct current power supply 1 which may be of any suitable construction such as a 28 volt direct current drawing its energy from the usual power lines. The direct current is supplied to the system from supply 1 over a positive line 2 and a negative line 3. In the illustrated embodiment of the invention, a pair of condition responsive anad indicating circuits 4 and 5 are shown interconnected to indicate a condition or state of a variable related to that station.

As the respective stations are identically constructed in the illustrated embodiment of the invention, the components in the circuit of station 4 will be described in detail with corresponding elements in station 5 similarly identified by corresponding primed number. In practice, many more similar stages or stations would also be similarly interconnected.

The condition responsive indicating station 4 includes a lamp 6 series connected with a sensing means such as a condition sensitive switch means 7 to a common pulse or flash line 8. The circuit to the negative power line 3 is completed through a repetitive switch 9. Thus, when the condition sensitive switch means 7 is actuated it completes the circuit through the lamp and the switch circuit 9 and permits a pulsating current through lamp 6 to create a visual indication of an abnormal condition. Additionally, the output of the switch 9 is connected to the common alarm control circuit 10 having an output connecting the pulsating output of circuit 9 to an audible indicator, shown as horn 11.

When either switch means 7 or 7' is actuated, the corresponding lamp 6 or 6' is flashed and simultaneously the common horn 11 is intermittently actuated to attract the attention of the attendant to the abnormal condition.

The attendant actuates an acknowledgment means 12 which is connected through an acknowledgment line 13 to the several stations and particularly to an electronic switch 14 at each station. The acknowledgment means 12 includes an actuating switch 15 for providing a signal to the switch means 14 and firing the switch means to conduct and create a short circuit path around the repetitive switch means 9. This provides a continuous illumination of the lamp 6 rather than the previous intermittent illumination. Further, it cuts off the switch means 9 and eliminates the pulsing signal through the common alarm control circuit 10 to horn 11 which is therefore silenced. In this alarm acknowledged condition, the lamp 6 burns continuously and horn 11 is silenced.

When the condition returns to normal, the means 7 returns to normal and breaks the circuit to turn off the lamp 6. This further breaks the circuit through the switch 14 which returns to the standby condition and readies the actuated station for sensing a subsequent abnormal condition. The turn-off of the switch 14 and the disconnection of the power through the sensing station 4 again triggers the common alarm control circuit 10 and provides energization of the horn in a continuous manner. The common alarm control circuit 10 is connected by a line 16 to the acknowledgment line 13. When the common alarm control circuit 10 is energizing the horn 11 continuously, a signal from the acknowledgment means 15 is operable to deactivate and return the circuit to the initial standby condition and thereby discontinue the operation of the horn 11. This returns the complete system to the standby position.

A lamp test circuit 17 connects the negative side of the several lamps 6 and 6' through a common line and includes a push button switch 18 to complete a circuit for the lamps directly across the power lines 2 and 3.

Briefly, in the operation of the illustrated embodiment of the invention, with all of the devices in a normal condition, the circuits through the several stations 4 and 5 are open. Upon a failure or fault, the one sensing circuit of the corresponding lamp 6 or 6' is completed through the repetitive switch 9 which flashes the appropriate lamp 6 on 6' and horn 11. When the operator acknowledges the alarm by actuation of switch 15, switch 14 is actuated to convert the operation of the energized lamp to a continuous burning and silences the horn 11. When the fault is corrected, the sensing device 7 opens the circuit to the appropriate lamp and returns the triggered station to the standby state. Simultaneously, a new actuation of the circuit 10 is triggered to operate the horn 11 in a continuous manner and thus provide an indication of the return to normal. The common alarm control circuit 10 is reset to standby by a second actuation of the switch 15 which turns off the horn 11 and returns the whole system to standby.

If more than one stage is triggered simultaneously or during a cycle of the annunciating system, the system will operate as described above with the individual lamps 6 and 6' providing indication of the several states of the stages.

FIG. 2 illustrates a preferred solid state circuitry for the several components shown in block diagram in FIG. 1. Only station 4 is shown in detail. Station 5 and other stations, not shown, would be the same.

Referring particularly to FIG. 2, the condition sensitive means 7 is illustrated as a set of normally open contacts 19 which may be a bimetal temperature switch or form the part of a condition sensitive relay or the like responsive to temperature, humidity, pressure or any other condition to be monitored. The contacts may also be connected to sense a movement or character of a device or element to be controlled.

The lamp 6 is connected to the positive line 2 and in series with the normally open contacts 19 and a diode 20 to the common pulse line 8 which is connected to the repetitive switch 9.

Generally, the illustrated repetitive switch 9 includes a two stage amplifier 21 including an output transistor 22 having its power circuit connected to the positive power line through the several circuits 4 and 5 via the pulse line 8. An input transistor 23 of amplifier 21 is connected to be energized from a free running or astable multivibrator circuit 24.

The multivibrator 24 is a conventional circuit and is shown including a pair of PNP transistors 25 and 26 connected to the power lines 2 and 3. The input to the multivibrator circuit 24 is through a network including a resistor 27 and a capacitor 28 connected directly across the lines 2 and 3 with the junction thereof connected in common to the emitters of the transistors 25 and 26. Resistive-capacitive networks 29 and 30 interconnect the input and output elements of the respective transistors 25 and 26 to provide a regenerative feedback network in accordance with known circuit design. The multivibrator 24 continues to produce a square wave output at an output collector 31 of the transistor 26. In a typical circuit similar to that shown in FIG. 2, the voltage output at collector 31 varied between 17 and 0 volts during conduction and cutoff of transistor 26, respectively. A total period of 1.2 seconds was employed, with 17 volts out for .6 of a second and 0 volt out for .6 of a second.

The square wave signal is impressed upon the input transistor 23 of amplifier 21.

The two stage amplifier 21 supplies a relatively large load current for operating of one or more of lamps 6 or 6' as well as lamps of other stages, not shown.

The amplifier 21 is a known amplifying circuit including the input transistor 23 connected in a common emitter circuit configuration with an input base 32 coupled through a resistor 33 to the collector 31 of transistor 26. When the output of the multivibrator is at 17 volts, the transistor 23 is biased to conduct and conversely when it is at a zero output level, the transistor 23 is cut off. The output of the transistor 23 is connected to the input of the transistor 22 which is shown as a PNP transistor having a base input connected directly to the output of the transistor output 23. The emitter-collector output circuit of the transistor 22 is connected in series with a diode 34 to the pulse line 8.

In brief summary, when the contacts 19 close, an energizing circuit is established from the positive line 2 through the lamp 6, the closed contacts 19, the diode 20 and pulse line 8 to provide a positive bias across the transistor 22. The transistor 22 is provided with an intermittent input bias as a result of the multivibrator 24, as noted above. Consequently, current through the output circuit of the transistor 22 in series with the lamp 6 is cyclical in accordance with the period of the multivibrator 24 to flash lamp 6.

The pulse signal line 8 is also connected to the common alarm control detection circuit 10 which includes a power transistor 35; shown as an NPN type having its emitter to collector circuit connected in series with the horn 11 across the power lines 2 and 3 in series with a resistor 36. A capacitor 37 is connected across the horn 11. A pair of dropping resistors 38 and 39 is connected directly between the pulse line 8 and the negative line 3 with the resistor junction connected to the input base of the transistor 35. During the period that the amplifier transistor 22 is cut off as a result of the zero voltage appearing at the collector 24 in the multivibrator 31, a small bias current flows from the positive line 2 through the lamp 6, the closed contacts 19, diode 20, line 8 and to the negative line 3 through the voltage dividing resistors 38 and 39. This provides a sufficient operating signal at the input of the transistor 35 to bias it to conduct and energize the horn 11. When the transistor 22 is again biased to conduct as a result of the high output voltage of the multivibrator 31, the emitter voltage of transistor 22 decreases as a result of the conduction and insufficient base current is supplied through the resistor 38 to the base emitter circuit of the transistor 35. Consequently, the transistor 35 cuts off and the horn is de-energized. The horn is thereby actuated in an intermittent manner upon the initial closing of the contact 19 and until a subsequent acknowledgment. It should be noted, the transistor 35 is also controlled through a separate inhibit circuit 40 as hereinafter described to provide an alternative functioning or control.

In summary, the closure of any one of the condition responsive contacts 19 or 19' actuates its associated lamp 6 or 6' and the horn 11 in an intermittent manner determined by the periodic square wave voltage of the multivibrator 24. When the lamp 6 is turned on, the horn 11 is off and conversely, when the lamp 6 is off, the horn is on. This initial repetitive annunciating condition continues until it is acknowledged, as hereinafter described.

If during the triggered state as just described, any additional sensing contacts are closed, the circuit is maintained in the above condition and additionally, the corresponding lamp of the additional contacts flashes in unison with the previously triggered lamp. If all of the sensing contacts 19 return to the normal condition before being acknowledged the system again triggers the horn 11 through circuit 40 to provide an all-clear annunciation which indicates a fault has occurred and corrected itself in a manner more fully described hereinafter in a normal sequence of operation.

The triggering to the alarm state is normally acknowledged through the action of the acknowledgment switch 15, which as shown in FIG. 2 has its one side connected directly to the positive line 2. The opposite side of the switch 15 is connected via the acknowledgment line 13 to all of the switches 14.

Each of the switches 14 includes a silicon controlled rectifier 41 connected in circuit to bypass the repetitive switch 9 in tne following manner.

The silicon controlled rectifier 41 is a well known device having an anode 42 and a cathode 43 forming a main power circuit. The circuit therebetween is normally open or nonconducting and is changed into a conducting state by the application of a control signal to a trigger gate 44. Once fired, the rectifier 41 will continue to conduct until such time as the current therethrough drops below a holding value or an opposed or opposite polarity is applied across the rectifier 41.

In the illustrated embodiment of the invention, the anode 42 is connected to the switch contacts 19 and the cathode 43 is connected to the line 3 via a diode 45 which is common to all of the rectifiers 41 of the several stages. Voltage dividing resistors 46 and 47 are connected between the cathode 43 and the acknowledgment line 13. The gate 44 is connected to the junction of the resistors 46 and 47 to receive a firing signal whenever the acknowledgment switch 15 is actuated. Thus, when the acknowledgment switch 15 is depressed or closed, it completes the power circuit from the positive line 2 through the switch 15, the line 13, resistors 46 and 47 and through the diode 45 to the negative line 3. The voltage signal fires the silicon controlled rectifier 41 to conduct and provides a direct path from the contact 19 to the negative line 3 via the rectifier 41 and the diode 45. Once fired, the silicon controlled rectifier 41 continues to conduct current through the lamp 6 to maintain a continuous energization thereof as a result of the inherent characteristic of the rectifier 41 and will continue to do so as long as the contacts 19 are closed to maintain the holding current through the circuit. Only when the contacts 19 are open to break the holding current will the rectifier 41 reset itself to its blocking condition.

The rectifier 41 is connected across the diode 20 and the transistor 22 and serves to reverse bias the diode 20 and thereby inhibit the current flow through the transistor 22.

The reverse bias on the diode 20 and the inhibiting of current through transistor 22 turns off the horn 11. As previously noted, the intermittent energization of the horn 11 is provided as a result of the intermittent bias provided to the transistor 35 from the positive line 2 through the lamp 6, the closed contacts, the diode 20 and resistor 38. When this circuit is cut off as a result of the back bias of diode 22, the horn 11 is silenced.

After acknowledgment, the state of the system is such that the lamp 6 is continuously on and the horn 11 is silenced. The state remains until the fault is corrected and contacts 19 open.

Upon return of the stage to the normal condition, the contacts 19 open and break the circuit to the rectifier 41 which resets to the nonconducting state and breaks the circuit through the lamp 6 which returns to the off condition indicating a return to normal. Simultaneously, in accordance with the present invention, a signal through circuit 10 and particularly circuit 40 is impressed on the transistor 35 to operate the horn 11 in a continuous manner providing an all-clear signal which subsequently must be acknowledged.

The inhibit circuit 40 includes a transistor 48 forming one control of the input bias or current to the transistor 35. The transistor 48 is shown as an NPN transistor having an emitter to collector output circuit connected to the lines 2 and 3 in series with a collector resistor 49. The input base 50 of the transistor 48 is connected to the junction of a pair of resistors 51 and 52 which are connected between the collector of the transistor 22 and line 3. The collector terminal 53 of the transistor 48 is connected in series with a pair of similarly polarized diodes 54 and 55 and a resistor 56 to the base of the transistor 35.

A completed turn-on circuit to transistor 35 is provided from line 2 through resistor 49, junction 53, diodes 54 and 55, and resistor 56 to the base of transistor 35. When transistor 48 conducts, junction 53 is connected to line 3 through the transistor 48 and removes the bias current and thereby inhibit operation of the horn.

A silicon controlled rectifier 57 generally corresponding to the rectifier 41 provides a second similar control of the input bias to transistor 35. The main circuit of rectifier 57 is connected between the junction of the diodes 53 and 54 and the negative power line 3. The rectifier 57 has its gate 58 connected to a pulsing circuit including a pair of resistors 59 and 60, the junction of which is connected to the gate 58, and a capacitor 61 connected in a parallel circuit with the resistors 59 and 60. The parallel circuit is connected in series between the lines 2 and 3 with a control diode 62 and the acknowledgement switch 15.

In operation, when the switch 15 is closed, a pulse signal is generated in the pulsing circuit providing a firing signal to the gate 58 to turn on the rectifier 57 which will then continue to conduct through the circuit of the resistor 49, terminal 53, diode 54, rectifier 57 to the negative line 3. The rectifier 57 puts a direct short across the input circuit to the transistor 35 consisting of the diode 55, the resistor 56 and the resistor 39 and inhibits the application of current from the transistor 48 to the transistor 35.

It does not however in any way affect the biasing of the transistor 35 to conduct as a result of the intermittent pulses of current through the pulse line 8, as previously described, because of the blocking action of the diode 55. The conduction of rectifier 57 is a standby state holding the inhibit circuit 40 in a condition to prevent energizing of the transistor 35 via the fixed input bias circuit.

When the system is triggered to announce a fault condition and transistor 22 conducts, base current is supplied to the transistor 48 through a circuit from the positive line 2, including the lamp 6, the contacts 19 and the diode 20 of the condition sensitive circuit 4, diode 34, transistor 22, resistor 51 to the base 50 of the transistor 48.

Initially, the base current may be of a very small value insufficient to cause actual illumination of the lamp 6 but sufficient to cause the transistor 48 to conduct. The collector and particularly terminal 53 drops to a low voltage level with respect to the line 3. This is sufficient to reverse bias the diode 54 which assumes a blocking state and removes the holding current from the rectifier 57. Upon initial triggering of a station 4, the inhibit or shunt control path through rectifier 57 is opened and simultaneously a second shunt control path is re-established through transistor 48 to prevent bias current through the fixed bias circuit of resistor 49, terminal 53, diodes 54 and 55 and resistor 56 to the base of the transistor 35.

The latter shunt or turn-off path is maintained during the acknowledged period via the controlled rectifier 41 of station 4 which is connected to the input side of resistor 51.

Upon return of the condition to normal, the station 4 returns to the normally open circuit condition and removes the bias from the transistor 48 which turns off. The rectifier 57 was previously turned off by the conduction of transistor 48 and as a result of its characteristic remains turned off after transistor 48 is again cut off. The fixed bias circuit via resistor 49 is no longer effectively shorted to line 3 and the transistor 35 again conducts to provide continuous energization of the horn 11 and an all-clear annunciation which must be subsequently acknowledged.

When the acknowledgement switch 15 is now depressed, it provides a pulse signal from the line 2 through the switch 15, diode 62 to the pulsing circuit consisting of the resistors 59 and 60 in parallel with the capacitor 61 to the gate 58. The gate signal turns on the silicon controlled rectifier 57 and again completes the inhibit circuit from the junction of diodes 54 and 55 to the negative line 3 to remove the bias current from transistor 35 which returns to the nonconducting state. The continuous energization of the horn ceases thereby indicating resetting of the complete system to standby.

The overall operation of the detailed circuit shown in FIG. 2 may be briefly summarized as follows.

When the abnormal or selected condition occurs at any one or more stages, the corresponding contacts 19 close and provide a complete circuit to the annunciating control and particularly the repetitive circuit 9 to complete the output circuit of the transistor 22. The transistor 22 is continuously biased between conduction and cut off by the operation of the multivibrator 24. Consequently, when the output circuit is completed through the closed contacts 19 and the lamp 6, intermittent energization of the lamp 6 is created. Simultaneously, a pulse current is applied to the base of the horn transistor 35 through the triggered station 4 whenever transistor 22 is cut off to cause transistor 35 to be operated in a similar intermittent manner for flashing operation of horn 11, the horn 11 being energized when lamp 6 is de-energized and vice versa.

During the initial triggering cycle, the circuit through the transistor 22 also provides a current to the base 50 of transistor 48 through the resistor 51. This signal is sufficient to reverse bias the diode 54 and turn off the silicon controlled rectifier 57 which in the standby condition is conducting through the circuit of resistor 49, diode 54 and rectifier 57 connected directly between the lines 2 and 3. The turn off of the rectifier 57 places the transistor 48 in control of the inhibit circuit for the balance of the cycle.

When the attendant acknowledges the alarm condition by depression of switch 15, a trigger pulse is impressed upon the silicon controlled rectifier 41 which conducts and bypasses the circuit of the diode 20 and the transistor 22 and further back biases the diode 20 to prevent current flow through the transistor 22. This provides a continuous current path through the lamp 6 from the line 2 to maintain continuous energization and elimination of the flashing of lamp 6 to indicate the acknowledged condition. The back bias on the diode 20 prevents the current flow through the diode and the transistor 22 and consequently removes the base current source from the transistor 35 which returns to the nonconducting condition.

Although the current path through transistor 22 is broken and the pervious bias path to transistor 48 opened, the rectifier 41 simultaneously creates the alternate bias path to transistor 48 which remains conducting and in control of circuit 40. The transistor 48 maintains an inhibiting current path preventing bias current from flowing from line 2 through resistor 49 through the input lead or to the diodes 54, 55, resistor 56 to the transistor 35 and the horn remains silent.

This system state remains until the fault is corrected and the condition returns to normal. At that time, the contacts 19 open to break the continuous energizing circuit of the lamp 6.

The bias current to the transistor 48 which had been supplied through contacts 19 and rectifier 41 is also removed and consequently, the transistor 48 will turn off. The silicon controlled rectifier 47 is also off as a result of the immediately previous operation of the transistor 48. Consequently, at this time a bias current path is provided from the line 2 via the resistor 49, terminal 53, diodes 54, 55 and resistor 56 to the input base of the transistor 35. The transistor 35 is therefore biased to continuously conduct and energize the horn 11 with a continuous horn signal announcing the cleared condition and automatically resetting the sensing circuits to standby.

This is acknowledged by actuation of the switch 15 which provides a pulse signal through the pulsing circuit to the gate 58 of the silicon controlled rectifier 57 which conducts and continues to conduct independently of a gate circuit signal. The conducting rectifier 57 reestablishes the bypass path for the bias current directly from the junction of the diodes 54, 55 to the negative line 3 and a bias current is removed from the transistor 35. The transistor 35 therefore returns to the standby condition, de-energizing the horn 11 and returning the system to a standby condition for the next cycle of operation.

When another fault occurs, the system is again triggered to simultaneously cause intermittent conduction through the appropriate lamp 6 and the amplifier 22 of the repetitive switch 9 to flash lamp 6 and horn 11 and the above cycle is repeated with the required dual acknowledgment of the alarm and the all-clear.

The system thus provides a continuous monitoring for each variable including means to indicate an abnormal state or condition, acknowledgment thereof, return of the system to normal and a final acknowledgment of such return. The dual indicating means, each of which is provided with different states of energization, provides a highly satisfactory and simple means to maintain a wide variety of indications while minimizing the complexity of the circuit and the components required. Each sensing stage also provides a very reliable and simple circuit requiring only the controlled rectifier at each of the points. The controlled rectifier forming a part of the sensing stage provides a unique function in transferring the alarm system from an intermittent to a steady state with all subsequent functions controlled directly from the power supply and independently of the flashing control circuit. The common pulsing or flashing circuit for supplying operating power to the lamps and for initial triggering of the horn as disclosed provides a very simple and direct flashing means without special pulse forming circuits for the two alarm means.

An important feature of the present invention resides in a construction permitting use of a single power supply for the several components in contrast to other systems employing flip-flops and other logic circuit devices to perform the several functions and requiring a plurality of different power supplies for operating the several components with different voltage levels and degrees of regulation.

Referring particularly to FIG. 2, the pair of leads to the appropriate condition sensitive means 7 need be connected in the field wiring. This reduces substantially the installation complexity and skill required with a commensurate reduction in cost.

The present invention as shown and described provides a relatively simple solid state annunciating and monitoring control without the use of any complex components with a resulting low cost and long, reliable life.

Various modes of carrying out the invention are contemplated as being within the scope of the following claims particularly pointing out and distinctly claiming the subject matter which is regarded as the invention.

I claim:
1. In a monitoring system for monitoring a plurality of variable conditions having individual means to indicate the corresponding conditions,
   a plurality of condition sensitive circuits each including condition sensitive switch means and an individual alarm,
   a common alarm having a common alarm energizing circuit,
   acknowledgment switch means to acknowledge an abnormal condition and a reset of an abnormal condition to normal, and
   an intermittent switching means connected in circuit with the condition sensitive circuits and the common alarm energizing circuit and responsive to actuation of a condition sensitive switch means to intermittently energize the corresponding individual alarm and the common alarm, said acknowledgment switch means being connected to the condition sensitive circuits and to the common alarm energizing circuit and actuated to acknowledge the alarm and operable to continuously energize the corresponding individual alarm and de-energize the common alarm, and circuit means responsive to reset of the abnormal condition after actuation of the acknowledgment switch means to de-energize the individual alarm and continuously energize the common alarm and responsive to subsequent actuation of the switch means and the reset of the abnormal condition to silence the common alarm,
   each of said condition sensitive circuits including a half wave rectifier in series with the individual alarm and the condition sensitive switch means between a power connection lead and a common pulse lead,
   said intermitent switching means including timing means connected to drive a power pulse amplifier between a first output level and a second output level for supplying a pulsating current sufficient to operate all the individual alarms in the system, said amplifier having an output means connected in series with the pulse lead to intermittently energize an individual alarm upon closure of a related condition sensitive switch,
   each of said condition sensitive circuits including a controlled rectifier connected in parallel with the half wave rectifier and the amplifier and operable to back bias the corresponding half wave rectifier when said controlled rectifier is conducting, said controlled rectifier having a firing circuit,
   said acknowledgment switch means connecting said firing circuit to the power leads for triggering the rectifier to conduct,
   said common alarm energizing circuit having a first input circuit connected to said pulse lead for intermittent actuation of the common alarm in response to actuation of any sensitive switch.
2. The monitoring system of claim 1 wherein said common alarm energizing circuit includes an electronic switch means connected in an operating circuit with the com- mon alarm and having an input means connected to said pulse lead, an input circuit connecting the input means to a power connection means to provide a turn-on bias, a pair of inhibit circuits connected in the input circuit to remove the turn-on bias, a first of the inhibit circuits being connected to the controlled rectifier of each sensitive circuit and to the output means of the amplifier, and the second inhibit circuit being actuated by the acknowledgment switch and reset by said first inhibit circuit whereby said common alarm and individual alarm are intermittently actuated in response to an abnormal sensed condition, said common alarm is silent when the individual alarm is continuously energized, said common alarm is continuously energized when an abnormal condition is cleared and is reset by actuation of the acknowledgment switch.

3. The monitoring system of claim 1 wherein a low voltage direct current source includes power leads one of which is connected to the power connection lead, said timing means is an astable multivibrator connected to said power leads and driving said pulse amplifier, said common alarm energizing circuit having a second amplifier connected in series with said common alarm to the power leads and having an input control circuit, means connecting the input control circuit to said pulse lead, a common alarm energizing circuit including an input branch circuit connected to the power leads and the input control circuit of the second amplifier and including a pair of series-connected diodes, a controlled rectifier connected intermediate the diodes to shunt the bias current from the second amplifier and having a firing circuit, an inhibit electronic switch having an output circuit connected to shunt the bias current from the diodes and adapted to reverse bias the adjacent diode and the controlled rectifier to turn off the controlled rectifier, and an acknowledgment switch connected to one of said power leads and to the firing circuits of said controlled rectifiers of each condition sensitive unit and to the firing circuit of the controlled rectifier of the detection circuit for triggering of the rectifiers to conduct.

4. The monitoring system of claim 3 wherein, said pulse amplifier is a two stage transistor amplifier driven between an esesntially zero output and a maximum output sufficient to energize all said lamps, the output stage of the amplifier including a power transistor having said output circuit, said second amplifier is a transistor having its input control circuit connected to said pulse lead, and the electronic switch of the common alarm energizing circuit is a transistor having an output circuit connected to shunt the bias current from the diodes and adapted to reverse bias the adjacent diode and the controlled rectifier to turn off the rectifier and having an input circuit connected to the power leads through said power transistor and individually through the several controlled rectifiers of the plurality of condition sensitive circuits.

5. In a monitoring system for monitoring a plurality of variable conditions, comprising a repetitive electronic switch having two different alternately established output levels, a condition sensitive circuit for each variable, each circuit including a condition sensitive means connected in a series branch with an output means, a diode connected between the series branch and the repetitive switch to establish a first energizing circuit for said output means, each circuit including a controlled rectifier connected in parallel with the diode in series with the corresponding repetitive electronic switch to establish a second energizing circuit for the corresponding output means, and acknowledgment means connected to actuate each of said controlled rectifiers.

6. The monitoring system of claim 5 wherein said electronic switch includes an astable multivibrator energizing an amplifier having an output circuit connected to the diode.

7. The monitoring system of claim 5 having, a second output means connected for operation through an electronic switch means, and an input connection between the electronic switch means and the junction of the diode and the repetitive switch.

8. In a monitoring system for monitoring a plurality of variable conditions having individual alarm means to indicate the corresponding condition, a power source means, a plurality of condition sensitive circuits each including a corresponding individual alarm means and having sensing means for connecting the individual alarm means to one side of the power source means in response to establishment of an abnormal condition, a common alarm means connected to said power source means by an electronic switch means having an input bias circuit connected to said power source means to turn on said electronic switch means, a by-pass switch means connected to said input bias circuit to open said input bias circuit, a repetitively actuated switch means connected to said condition sensitive circuits and to said electronic switch means independently of said input bias circuit to establish repetitive alternate operation of said individual alarm means and said common alarm means in response to operation of said sensing means to an abnormal condition, an acknowledgment means connected to said condition sensitive circuits to disconnect said individual alarm means and to disconnect the common alarm means from said repetitive switch means and to connect the individual alarm in an acknowledged circuit for continuous energization in which said individual alarm means is controlled by the associated sensing means, said acknowledgment means being connected to said by-pass switch means to actuate said by-pass switch means to open said input bias circuit, and second by-pass switch means connected in said input bias circuit, said second by-pass switch means being energized by continuous energization of said individual alarm means, said second by-pass switch means resetting said first by-pass switch means and connected to said input bias circuit to by-pass said input bias circuit under the control of said sensing means, whereby the first actuation of the acknowledgment means to acknowledge the alarm condition is not operative to establish said first by-pass switch means and a second actuation of the acknowledgment means after clearance of said abnormal condition is operative to establish said first by-pass switch means to open said input bias circuit and de-energize said common alarm means.

9. The monitoring system of claim 8 wherein said repetitively actuated switch means includes an electronic on-off switch connected in common to said plurality of condition-sensitive circuits through a diode means, the junction of the diode means and the condition-sensitive circuits being connected to said electronic switch means whereby conduction of said on-off switch is operative to energize the individual alarm and to de-energize the common alarm.

10. The monitoring system of claim 8 wherein said electronic switch means is a transistor connected in series with a common alarm to a power source and said input bias circuit including resistor means in series with a pair of diode means connected to said power source, said condition-sensitive circuits being connected to said transistor to establish an alarm responsive input circuit thereto and said repetitively actuated switch being connected to said transistor to by-pass the alarm responsive input circuit, said first by-pass switch means being a gated rectifier means connected to the junction of the pair of diode means and the transistor to by-pass the corresponding input to the transistor.

References Cited

UNITED STATES PATENTS

| | | | |
|---|---|---|---|
| 3,084,338 | 4/1963 | Mauer | 340—213.1 |
| 3,119,103 | 1/1964 | Fertig | 340—413 |
| 3,147,464 | 9/1964 | Spielman | 340—213.1 |
| 3,176,284 | 3/1965 | Jones | 340—409 |
| 3,124,793 | 3/1964 | Foster | 340—213.2 |
| 3,218,621 | 11/1965 | Foster | 340—213.2 |
| 3,287,717 | 11/1966 | Kraus | 340—213.2 |

THOMAS B. HABECKER, Primary Examiner

U.S. Cl. X.R.

307—252